Figure 20:
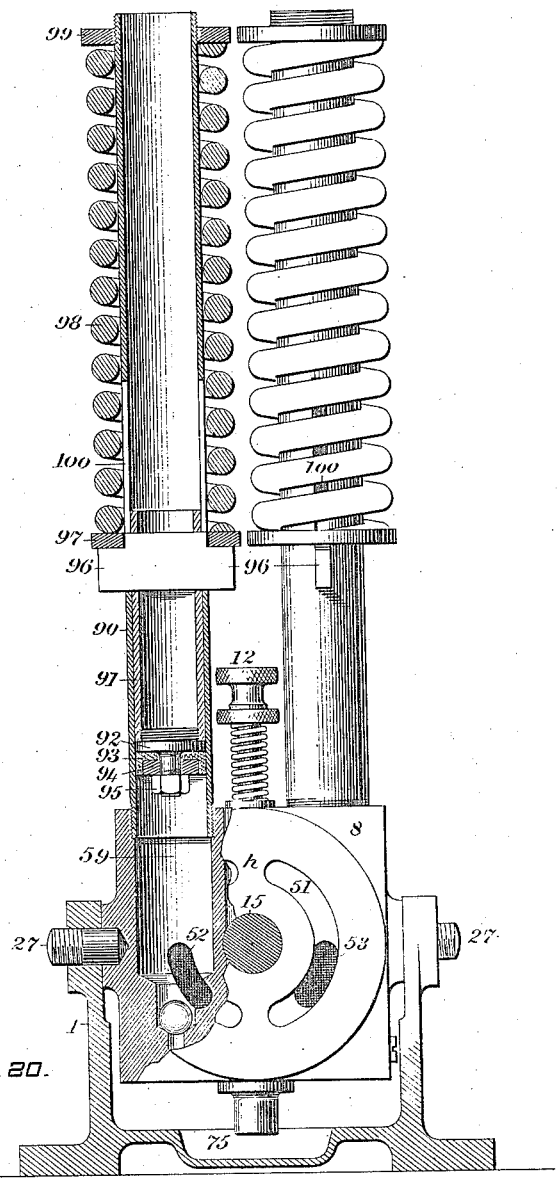

H. D. WILLIAMS.
APPARATUS FOR TRANSMITTING POWER AND REGULATING SPEED.
APPLICATION FILED AUG. 23, 1901.
1,044,838.
Patented Nov. 19, 1912.
4 SHEETS—SHEET 1.
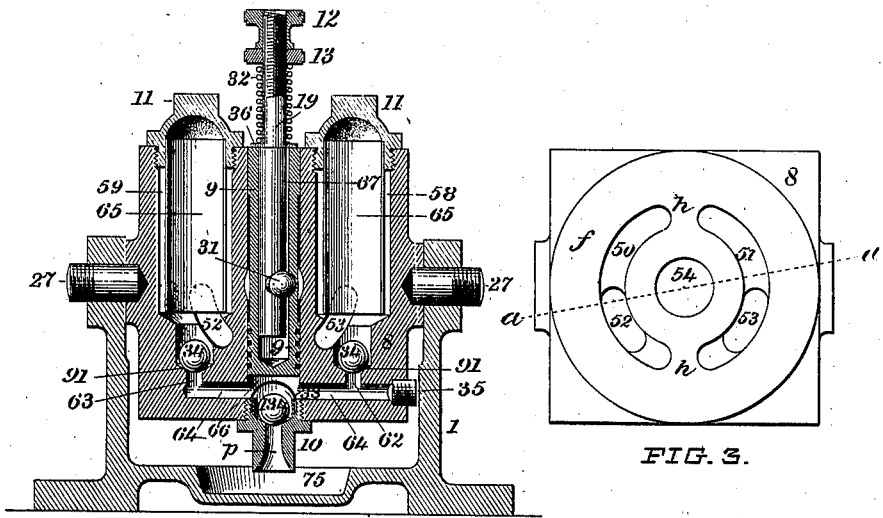
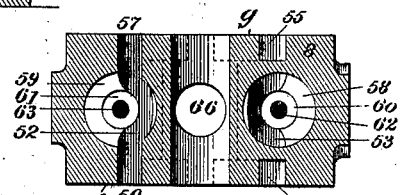
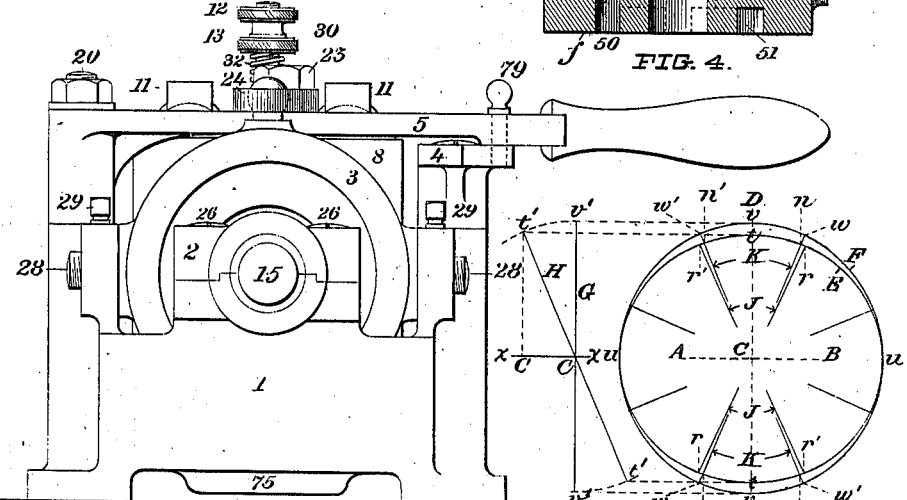
WITNESSES,
Charles H. Houghton
James H. Walbridge
INVENTOR,
HARVEY D. WILLIAMS.
BY Franklin Scott, ATTORNEY.

H. D. WILLIAMS.
APPARATUS FOR TRANSMITTING POWER AND REGULATING SPEED.
APPLICATION FILED AUG. 23, 1901.
1,044,838.
Patented Nov. 19, 1912.
4 SHEETS—SHEET 2.
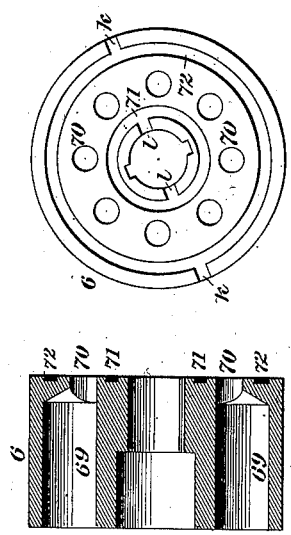
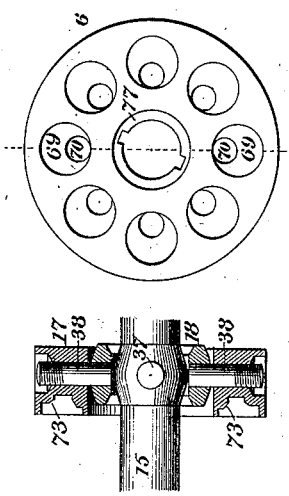
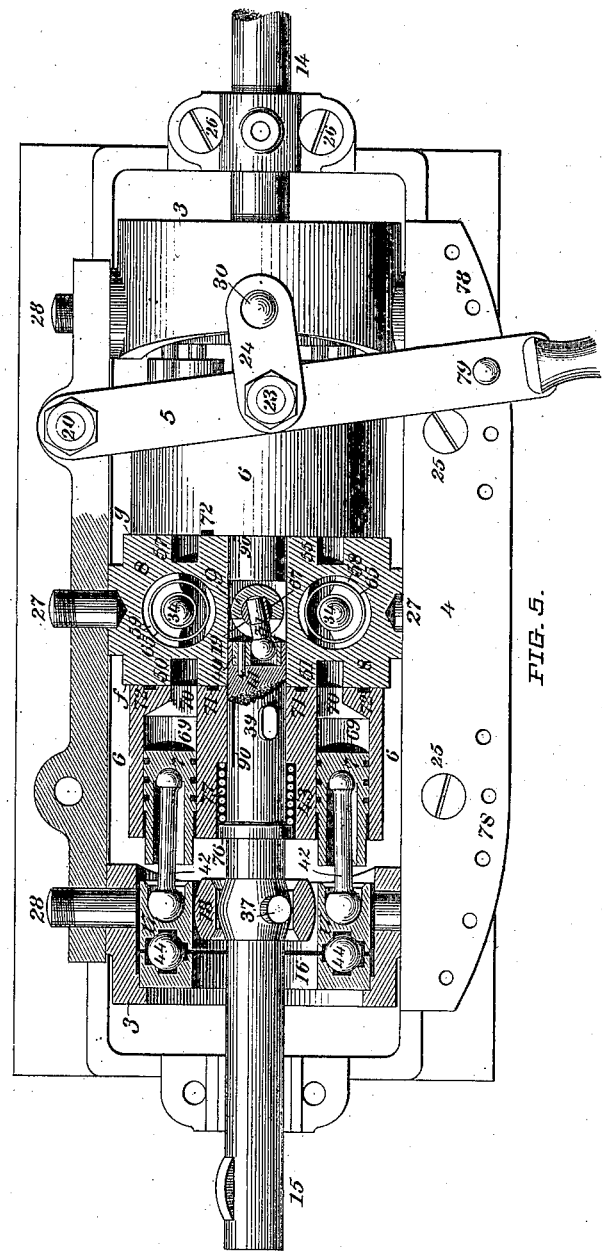
WITNESSES
Charles H. Knighton
James H. Walbridge
INVENTOR
HARVEY D. WILLIAMS.
BY Franklin Scott, ATTORNEY.

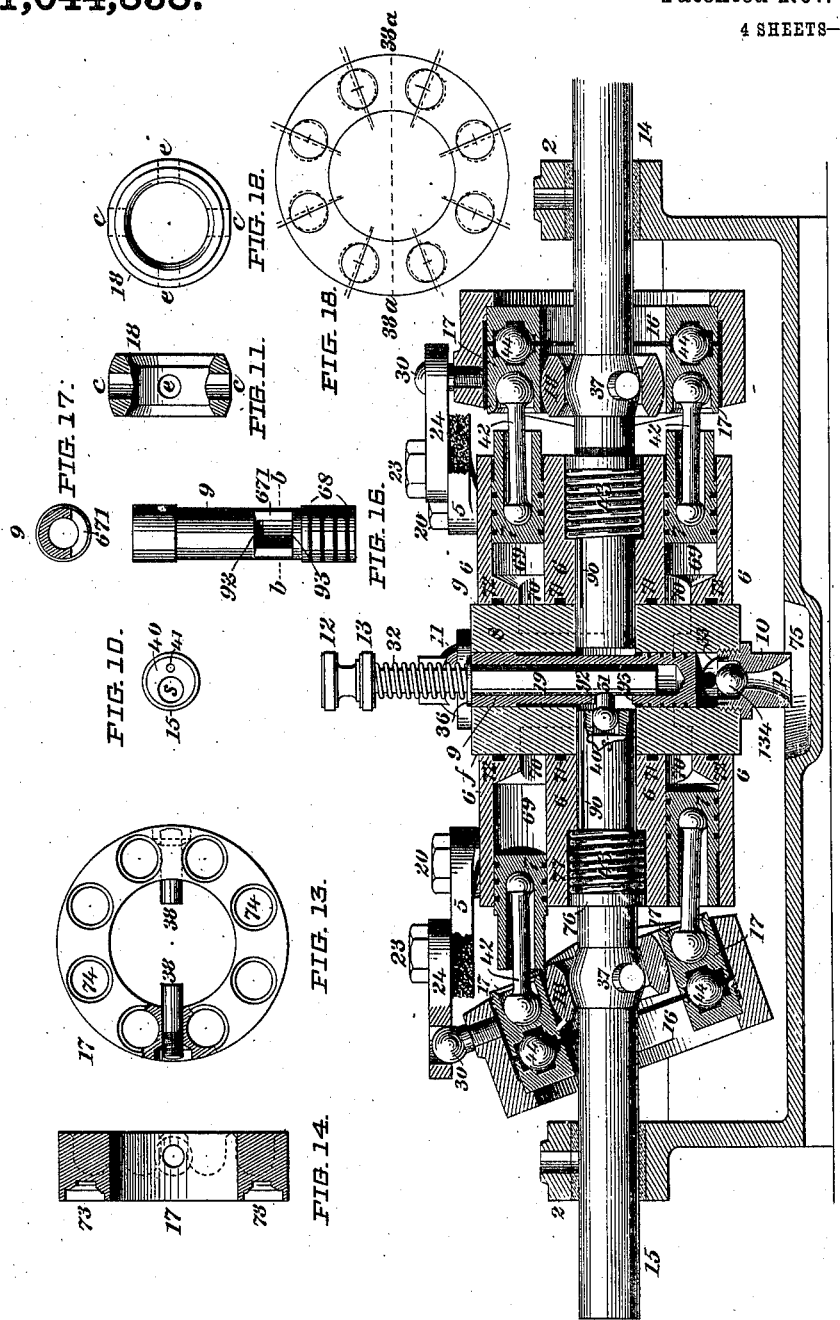
H. D. WILLIAMS.
APPARATUS FOR TRANSMITTING POWER AND REGULATING SPEED.
APPLICATION FILED AUG. 23, 1901.
1,044,838.
Patented Nov. 19, 1912.
4 SHEETS—SHEET 3.
WITNESSES.
Charles H. Knighton
James H. Walbridge
INVENTOR.
HARVEY D. WILLIAMS.
BY Franklin Scott, ATTORNEY.

H. D. WILLIAMS.
APPARATUS FOR TRANSMITTING POWER AND REGULATING SPEED.
APPLICATION FILED AUG. 23, 1901.

1,044,838.

Patented Nov. 19, 1912.

4 SHEETS—SHEET 4.

WITNESSES,
Charles H. Houghton.
William Hesslein

INVENTOR,
HARVEY D. WILLIAMS,
BY Franklin Scott, ATTORNEY.

UNITED STATES PATENT OFFICE.

HARVEY D. WILLIAMS, OF WASHINGTON, DISTRICT OF COLUMBIA, ASSIGNOR TO THE WATERBURY TOOL COMPANY, OF WATERBURY, CONNECTICUT, A CORPORATION OF CONNECTICUT.

APPARATUS FOR TRANSMITTING POWER AND REGULATING SPEED.

1,044,838.         Specification of Letters Patent.     Patented Nov. 19, 1912.

Application filed August 23, 1901. Serial No. 72,999.

*To all whom it may concern:*

Be it known that I, HARVEY D. WILLIAMS, of the city of Washington, in the District of Columbia and United States of America, have invented certain new and useful Improvements in Apparatus for Transmitting Power and Regulating Speed; and I hereby declare that the accompanying drawings, with the subjoined description thereof, constitute a specification of said invention.

This invention has for its object to transmit power and impart motion from a prime mover to the mechanism to be operated through and by means of a gas, fluid or liquid which constitutes the transmitting medium, without the intervention between the driving and driven mechanism of belts, gears, clutches or any device involving positive mechanical engagement of parts made of solid material.

A further object is to provide means for adjusting a constant driving speed to variable speed or resistance of the driven mechanism, and for reversing the motion of the driven parts.

This invention belongs to that class of machines for transmitting power wherein a gas, fluid or liquid held in confinement is compelled by the motor or driving force to move in an orbit of continuous circulation from the active or propulsive member of the organism through a transmission port to the receptive or actuated member, thence by a return port to the active side of the apparatus whence it started. The influence exerted by the active or power side of the system is in the nature of forcible injection, the injecting current being directed against parts which are adapted to yield to the injecting force and are connected with and thereby move the apparatus to be driven, the load to be moved or the resistance to be overcome.

In carrying out my invention I have embodied one modification of it in the form of a duplex pumping system consisting of a driving shaft carrying a cylinder so mounted as to revolve with and have a slight longitudinal movement upon the shaft. This cylinder is bored with a plurality of piston chambers arranged in a series concentric with the axis of the driving shaft, the axes of which are preferably parallel with the axis of the shaft, pistons for said chambers and driving connections mounted on said shaft adapted to revolve therewith, and, in coöperation with the adjustable stationary devices, adapted to impart reciprocating motion to each of the pistons, which combination constitutes the active or potential factor of the apparatus. The mechanism upon which the active factor exerts its force consists of a duplicate of the pump cylinder, pumps and driving connections similarly mounted upon the driven shaft, and of the adjustable stationary devices adapted to govern the reciprocation of the pistons in the same manner as those of the active side are controlled. Between the two halves of this duplex system is interposed a stationary member which is fitted with two ports or channels which afford communication between the piston chambers of the two cylinders, one for the transmission of the circulating medium from the active or driving end of the apparatus to the passive or driven end, and the other for its return. The apparatus is provided with air chambers connected with the port channels to equalize and relieve irregular and excessive pressure therein, and also with special means for replenishing waste of the circulating medium which may result from leakage from the joints. It is also provided with means for neutralizing back pressure on the driving cylinder, whereby the structure may be greatly reduced in weight and the friction of operation can be greatly reduced.

The apparatus will first be described in connection with the drawings and the features of invention subsequently pointed out in the claims.

The invention is fully shown in the drawings in which—

Figure 1 shows an end elevation of one form of embodiment of my invention. Fig. 2 shows a central vertical transverse section of the same. Fig. 3 is a face view of the valve plate or port block. Fig. 4 is a section through the same taken on the line *a—a* of Fig. 3. Fig. 5 shows a plan of the machine partially in horizontal section. Fig. 6 shows a longitudinal section of one of the pump cylinders, taken on a plane passing through two opposite chambers. Fig. 7 is a back view of one of the pump cylinders. Fig. 8 is a view of the face side of a pump cylinder. Fig. 9 is a detail view of the universal joint connection between the shaft, trunnion ring and socket ring. Fig. 10 is an end view of the driving shaft showing an eccentric socket with which the pump that replenishes the circulation is connected and by which it is driven. Fig. 11 shows a half-section of the trunnion ring taken through the axis of the bearings for the trunnions of the driving shaft. Fig. 12 is a side view of the trunnion ring. Fig. 13 is a face view of the socket ring and shows the pivots which connect it with the trunnion ring and upon which it turns. Fig. 14 shows a diametral section of the socket ring. Fig. 15 is a vertical longitudinal section of the whole machine taken through the axis of the shafts. Fig. 16 is a front view of the replenishing pump plunger. Fig. 17 is a transverse section of said plunger taken on the line $b—b$ of Fig. 16. Fig. 18 is a diagram showing the differential spacing between the centers of the ring sockets. Fig. 19 is a diagram explanatory of the variable angular velocity of the inclined socket rings. Fig. 20 shows a modification of the means for alleviating abnormal pressure in the ports.

The use of a liquid like oil or water as a medium or vehicle for the transmission of power in an apparatus wherein such medium is made available by forcing the same in confinement through channels, ducts or passages against parts of the apparatus to be driven, which by yielding to the pressure so applied impart motion to the mechanism to be driven, broadly considered, is not new. But hitherto very serious obstacles to this method of transmission of power have existed which have practically precluded its commercial success and its introduction into general use. Among such obstacles may be noticed the inordinate tension upon the confining and working parts resulting from the great pressure developed in forcing the liquid from one part of the system to another, which pressure tends to separate contiguous parts of the apparatus at the working joints through which the transmitting fluid escapes, resulting in a steady but rapid depletion of the system of its vital element. To counteract this tendency, abnormally strong and heavy structures are necessary to withstand the great strain even partially, and such structures do not adequately meet and overcome the difficulties. To properly eliminate back pressure from the valve system and to maintain in the circulatory system a full working complement of the circulating fluid have heretofore presented serious difficulties. To relieve against or neutralize back pressure as above indicated, to provide means for effecting an automatic replenishment of the wasted circulating medium, to provide relief to the apparatus against the sudden strains incidental to an abrupt change of speed or load, to secure constancy in the volume and velocity of the circulating medium are some of the leading objects of this invention. It has not hitherto proved feasible to operate successfully machines of the kind herein described in the absence of provisions for counterbalancing back pressure, for the reason that the slightest separation of the pump barrels from the valve plate due to the pressure necessary to be maintained to transmit the power successfully, permitted the circulating fluid to escape so rapidly, which escape involved such a loss of power that such apparatus became wholly impracticable.

The mechanism constituting the operative part of my invention consists in the driving devices and the driven devices, which are in this modification thereof, duplicate counterparts of each other, between which is interposed a stationary member through which the transmission channels or ports pass and with which the relief chambers and the oil replenishing devices are connected. Each half is provided with independent means for varying, reversing or arresting the action of the driven parts, and there is no positive or mechanical connection of any of the parts of one end of the apparatus with those of the other end.

The invention is shown as an isolated structure adapted to be interposed between a motor with which the shaft at one end may be connected, and the machinery to be driven with which the shaft at the other end may be connected.

I have shown my apparatus mounted upon a frame or stand 1 which in this case is preferably in the nature of an open box having a tight bottom which will catch and carry oil or any other medium which may be employed to charge the apparatus. At the bottom in the center is a sink 75 which serves as a settling basin and into which the suction plug 10 of the replenishing pump projects. In the center of the stand the valve plate 8 is hung on two pivots 27, 27, to favor proper axial alinement of the two shafts and their dependencies. This plate is bored concentrically with the axis of the machine to provide bearings for the inner ends of shafts 14 and 15, the outer end, of which are carried in bearings 2 2, at the ends of stand 1. As all the parts connected with or carried by shaft 15, which is the driving shaft, except the device which drives the replenishing pump, are like the parts similarly connected with or carried by shaft 14, which appertains to the driven mechanism, a description of the construction of the driving end of the apparatus will answer for the driven end, the differences between the two ends relating more particularly to functional performance.

The driving shaft extends out beyond the stand to take on a pulley, gear or other means for connection with a motor, and is fitted with trunnions 37 upon which is pivoted the trunnion ring 18. As seen in Fig. 9, the socket ring 17 is pivoted to the trunnion ring 18 by pivots 38 set at right angles to trunnions 37, whereby a universal or Hooke's joint is obtained which enables the socket ring to be adjusted within certain limits in any plane of inclination. This ring, shown in Figs. 13 and 14, is bored from one face with ball sockets 74 to receive the ball shaped ends of the pitmen 42, and its opposite side is fitted as one member of a ball race 73. The companion member of this race 16, which is relatively stationary, is a similar piece, carried or seated in a tilting ring 3 which is hung on horizontal pivots 28 so as to oscillate thereon. The several pivots 28, 37 and 38 are all in the same plane when the ring 3 is tilted to a plane perpendicular to the axis of the shaft 15. The ring 3 may be inclined by means of lever 5 which is fulcrumed on the stand at 20 and is connected with the ring by means of link 24 which engages knob 30, an appurtenance of the ring. Any suitable means for holding lever 5 in its adjusted position may be used, as the holes 78 and pin 79. These provisions are for adjusting the plane of the ball race to any desired angle of inclination to the axis of the driving shaft, as the length of the stroke of the pump pistons is determined by such angle. As both tilting rings are provided with these means for their independent adjustment it is possible to control the apparatus by either of them as a reversal of inclination of either tilting ring will effect a reversal of motion of the driven shaft. The ball-race 16—17 and balls 44 constitute a thrust bearing to resist the pressure resulting from overcoming the resistance of the load carried by the driven shaft in forcing the circulating medium from the pump chambers of the driving end through the pressure port into the corresponding chambers of the receiving motors.

The pump cylinder 6 is attached to the inner end of the shaft so as to revolve therewith and for the accommodation of the other parts has a slight longitudinal movement thereon over the spline or key by which it is driven. These cylinders are shown in detail in Figs. 6, 7 and 8, and are planed to closely fit the faces $f$ and $g$ of the valve plate 8. They are fitted with a number of piston chambers 69 corresponding in number and position with the sockets in the ring 17, in which the pistons 7 reciprocate. These pistons are moved in one direction by the direct action of the inclined socket ring through the pitmen 42, both ends of each of which are finished with a ball terminal, one of which is seated in socket 74 in the ring 17 and the other in a socket in the piston 7. The members of this connection between the pistons and the ball bearing socket ring are held in juxtaposition on the driving side of the apparatus by the pressure created by the action of the socket ring, and on the exhaust side by virtue of extra pressure which is developed by the action of the replenishing pump as hereinafter explained. The passages 70 which open out of the piston chambers into the ports of the valve plate are much smaller in caliber than the piston chambers in order to provide means for neutralizing back pressure on the entire pump cylinder 6. The outer ends of the pump cylinders are counterbored as at 77 to take in a coil spring 43. This is an expansive spring one end of which abuts against the shoulder 76 of the shaft, and the other against the bottom of the counterbore of the cylinder 6 whereby its force is exerted to press the cylinder against the face of the valve plate whenever all other pressure is taken off. Thus when the socket ring stands at right angles with the shaft and the latter is rotated there will be no movement of the pistons and therefore no pressure in the chambers or port channels will be developed by them to press the cylinder against the valve plate. At such times contact between the cylinder and valve plate will be maintained by the pressure of spring 43, as in the process of filling the system with oil preparatory to starting up. The spring, however, is not an essential to the working of the apparatus after it is started.

The provisions made for neutralizing the back pressure upon the face of the cylinder 6 due to the tendency of the pressure generated in the inlet or pressure port to force the oil out between the face of the cylinder and the adjacent face of the valve plate, which is very strong, consist in confining the field of that pressure to an area which may be counteracted by an opposing field provided therefor in the chambers. This is effected in this case by means of the open concentric channels 71 and 72 shown in Fig. 8. The outer of these channels opens out into the open air through the openings $k\ k$, and the inner through the openings $l\ l$, which communicate with a groove 90 cut in the shaft or cylinder and which extends to and opens out into the counterbore 77. By means of these channels, or any equivalent means, the field of back pressure on the cylinder face at the running joint with the valve plate can be reduced to the desired limit. To oppose and neutralize the pressure on this field the outlets from the piston chambers are made much smaller than the diameter of the chamber as shown at 70 in Fig. 7, thus leaving an area of surface between the periphery of the piston chamber and the periphery of the outlet exposed to direct pressure. These spaces in this case appear in the crescent-shaped surfaces seen in Fig. 7 and the aggregate of their superficial area is opposed to the field of the face of the cylinder which is exposed to back pressure as above outlined. In practice these opposing fields are balanced as desired by proportioning the diameters of the piston chambers with reference to the area of the field between the concentric channels of the cylinder face which is exposed to back pressure. As this effect or result of balancing the cylinders may be effected in various ways I do not confine myself to this method. If desirable, a slight preponderance of direct pressure upon the inside of the piston chambers over the back pressure on the running face, may be provided in adjusting the balancing features just described, for the purpose of maintaining constant contact between the face of the cylinder and that of the valve plate, for example, as a substitute for the spring 43, or both may be retained if thought expedient, but in no case should such an amount of direct pressure be brought to bear constantly on the cylinder as to develop any undue friction in the running joint. These provisions effectually prevent the rapid escape of the circulating medium through the running joint under any normal working pressure and also tend to reduce friction.

The port block or valve plate 8, which is seen in Figs. 2, 3 and 4 is a solid member pivoted across the middle of the machine upon the centers 27 27. It is axially bored as at 54 to provide bearings for the inner ends of the two shafts 14 and 15, and vertically as at 66 to receive the replenishing pumping apparatus. It is faced on the opposite sides $f$ and $g$, to form a plane seating in the nature of a valve seat, against which the inner ends of the pump cylinders rotate. The cylinders and faces of the valve plate are very accurately fitted to each other to prevent as far as possible the escape between them or through the joint so formed, of the circulating medium. On each face of the valve plate are sunk two concentric channels marked on the drawing at one side of the plate 50 and 51 and on the other side 57 and 55. Each of these port channels extends half way around the shaft less a space $h$, Fig. 3, equal to the diameter of one of the outlets 70 of the piston chambers, so that when in apposition, one half of the outlets from the chambers may open into the channel on the right half of the plate and the other half into the channel on the left half. These channels on the opposite faces of the valve plate 8 8, are connected by the ports 52 and 53 so that at all times in operation there may be free communication between the cylinder chambers on the front side of one end of the machine through the port channel 51, port 53 and port channel 55 with the opposite chambers of the front side of the other cylinder, and also a like communication from the pump cylinders of the rear of the driven end through the port channels 57, port 52 and channel 50 with the rear side of the driving end. The direction of the circulation will depend on which way the tilting ring 3 and socket ring are inclined with reference to the axis of the driving shaft. The ports and port channels are arranged on opposite sides of an axial plane which is perpendicular to the axis of revolution of the tilting rings 3 3. In practice the piston chambers of the pump cylinders, the port channels and the ports are filled with the circulating medium, which preferably is a lubricant, and for convenience will hereinafter be called an "oil." As under certain conditions this oil is driven around the circulatory track under enormous pressure, there is liable to be some loss from leakage which in a short period of operation would exhaust the apparatus unless such waste be replenished as fast as it occurs. For this purpose a special pumping apparatus is provided which draws from a supply of oil carried in a well or reservoir 75, beneath the machine. The oil so drawn from this reservoir is automatically gaged to accurately supply the depletion as it occurs so that no more than is requisite for that purpose will be taken up or injected.

The pumping apparatus consists of a plunger 9 which plays in the bore 66 of the valve plate 8. Within this plunger the piston rod 19 is fitted to reciprocate. The bore for this piston rod is closed at the bottom, but one side of the piston rod is flatted as at 67, Figs. 2 and 5, to admit air to the bottom of the bore to relieve against atmospheric pressure when the piston rod is lifted. The upper end of this piston rod is reduced which leaves a shoulder upon which the washer 36 rests. This washer serves as a seat for the spring 32 which is carried on the reduced end of rod 19 and rests upon it at all times. This spring is an expansive one and its tension is regulated by the adjusting nut 13 and check nut 12. The piston rod 19 is reciprocated by means of a crank-pin 31 which projects from its side and plays through gap 67 of the plunger 9. This pin has a ball at its outer end which works in an eccentric socket $s$, Figs. 10 and 15, in the end of the driving shaft 15. Thus the rotation of the shaft 15 in either direction produces vertical reciprocation of the piston rod within the plunger. The lower end of bore 66 is closed with the screw plug 10 which has a funnel shaped bore, the upper end of which is fitted as a valve seat for the ball 134, the lower end opening down into the oil in the sink 75. This valve is held in place by any suitable keeper, as the wire 33, which will permit it to open and close freely.

On opposite sides of the replenishing pump are the air chambers 58 and 59, one for each port. As the ports are reversible, either being liable to become the pressure port, an air chamber is provided for each. These open at their bottoms into the ports 53 and 52 respectively, and each has a valve-seat 91 at its bottom with which the ball valves coöperate to open or close the passages 62 and 63 respectively, which in turn open into the passage 64 which communicates with the plunger chamber 66 and also with the port $p$ of the plug 10. The tops of the chambers 58 and 59 are closed with screw caps 11 which have a depending open bottom cylinder 65 that extends down into the chamber. This cap and depending cylinder are either integral or else the joint between them is hermetically sealed. Its function is to secure an operative air chamber within the main chamber if there should happen to be a leakage of air through the screw joint at the top, in which case, presuming the level of the oil in the chamber to stand above the plane of the bottom of the cylinder 65 in the annular space surrounding that cylinder, if the pump should make an injecting stroke, and air should escape through the screw joint, yet there would be sufficient air within the chamber to answer all practical purposes which should not be affected by the leak. This provision is in the nature of a supplemental air chamber designed to be operative if the main chamber should for any reason fail to act efficiently as above described. By reference to the drawings, and especially to Fig. 4, it will be seen that the pressure regulators constituted by the chambers 58, 59 are connected with the transmission ports 51 and 50, (through the medium of the ports 53, 52 respectively) at the central portions of said transmission ports, that is, between the ends or orifices of the transmission ports.

As a modification of this method of equalizing pressures any other device in the nature of a spring may be substituted for the air chamber. For example, the bores 58 and 59, instead of containing air could be fitted with pistons and these pistons could be supported above by suitable springs to allow them to yield to the greater pressures and come down again when the pressures are less. Such a modification is illustrated in Fig. 20. In this case the screw-caps and their depending cylinders are dispensed with and long piston tubes 90 are screwed into the tops of the chambers 58 and 59. A hollow piston 91 is fitted to slide within each of these tubes fitted with a head 92 which is screwed into its lower end, and has a depending stem over which a washer packing 93 and an expander 94 are fitted so that they may be tightened up by means of the nut 95 so as to be oil or water tight in order that the piston may slide within the tube without leakage. Piston 91 is mortised near its top to take in the cotter 96 and the tube 90 is slotted as at 100 to provide a slide-way for the cotter. The reciprocative movement of the piston is limited by the length of this slot. The upper corners of the cotter are rabbeted as shown to afford a seat for the washer 97 which can slide freely over tube 90 and forms a seat for the expansive spring 98 which is passed over the tube and rests thereon. Another washer 99 is screwed onto the top of the tube above the spring and constitutes an abutment for the same to work against. The tension of spring 98 can be regulated by screwing washer 99 up or down. In this modification of my invention the circulating medium is designed to fill the chambers 58 and 59 below the piston head, and any abnormal pressure of the fluid in either chamber will be exerted to lift the piston against the pressure of spring 98 which acting through washer 97 and cotter 96 upon the piston 91 tends to force it downwardly or against the abnormal pressure to the extent of the under edge of the cotter striking the bottom of slot 100.

In the apparatus here shown, no positive mechanism is shown for keeping the ball ends of the pitman in their sockets in the socket ring and in the pistons of the pump cylinders. On the pressure side of the apparatus their proper connection will be maintained by the pressure resulting from driving the oil from the active to the receptive end of the apparatus, but this force is not available for that purpose on the exhaust side. On the exhaust side the oil is returned by the action of the pistons connected with the driven mechanism, but as some degree of leakage of the oil in transmission may exist, it is apparent that the return current through the exhaust port will not be sufficient to keep the pitmen heads in close connection in their sockets, as the pistons on the receiving end of the exhaust side might not make a full stroke on account of leakage on that side of the machine. Hence the replenishing pump is provided to force oil into the exhaust port so as to keep the system full, and also to establish therein a pressure sufficiently above the normal to force the pistons of the driving and driven ends apart and thereby seat the terminals of the pitmen in their respective sockets in the pistons and socket rings. This is effected in the following manner:—As above stated, the rotation of the driving shaft 15 through pin 31 causes the piston rod 19 to play up and down inside plunger 9. The latter has no positive movement but responds to the requirements and conditions of the circulation. When the plunger rises it draws oil from the reservoir 75 and fills the channels 64, the valve 134 rising to allow its admission. When the plunger descends it forces the oil through one or the other of the passages 62 or 63 past the valves 34 into the air chamber which communicates with the port. If the pressure in the air chamber or in the port with which it communicates is sufficient to overcome the tension of spring 32 when the piston is on its down stroke, then the plunger will come to rest when equilibrium between these pressures is reached, and the remainder of the down stroke of rod 19 will be completed inside of the plunger 9, but if the pressure in the port is less than the expansive strength of spring 32, when the rod 19 makes its down stroke it will carry the plunger down with it and thus force oil from the passages 64 into the air chamber and exhaust port. On its next upward stroke pin 31 engaging the upper edge 92 of the plunger gap, will force the plunger up, and valve 134 yielding to this force will open and oil from the reservoir 75 will be drawn up into the passages 64 to replace that forced into the chamber to the extent of filling such passages which passages thus serve as a storage chamber for oil ready to be injected into the fluid connections to replenish waste. When the pressure in the exhaust port is less than the tension of spring 32, when rod 19 is on its down stroke the spring will force down the plunger and thereby force oil into the port channel, and the up-stroke of rod 19 will positively lift the plunger and thus draw into the passage 64 oil from the reservoir 75. When there is no pressure in the exhaust port and the shaft is rotated the rod and plunger will reciprocate together, the plunger being forced down by the spring and lifted by the crank-pin. Thus the circulatory channels are kept full. The extra pressure required to maintain connection between pistons, pitmen and ring sockets is obtained by setting up the nuts 12 and 13 until an abnormal pressure in spring 32 is established the exertion of which is constant on the exhaust side of the apparatus. The operation of the replenishing pump exerts no influence on the driving side of the apparatus for the high pressure resulting from the action of the driving pumps keeps valve 34 on that side constantly closed while the apparatus is in operation. Thus positive connections between the socket ring and the pistons may be dispensed with, and the action of the replenishing pump is placed under the control of the varying pressure in the exhaust port which results from waste or leakage of the circulating medium.

From the foregoing it is apparent that when the ball race is not inclined to the axis of the shaft no reciprocation of the pistons in their chambers can take place, and hence no oil can be circulated and neither motion nor power can be transmitted to the driven mechanism; but when the driving socket ring is inclined in either direction a reciprocating movement of the pistons in their respective chambers will be possible equal to the distance between two transverse planes one cutting the center of the ball socket at the upper side of the ring and the other the center of the ball socket at its under side. Therefore, it is apparent that if the inclined ball race be divided by a plane co-incident with the axis of the shaft but perpendicular to the axis of oscillation of the tilting ring, one half of the ball race will be an ascending track, for the balls and socket ring, and the other half a descending track, whichever way the tilting ring be inclined. This is also true of the apparatus of the driven end of the machine. The pistons of the pumping system which are operated by the ascending half of the socket ring act to force the oil through one of the ports, which, from that fact, may properly be designated as the "pressure" port, while the other may be termed the "exhaust" port. As the piston chambers of the driven cylinder are arranged with reference to the port channels on that side of the valve plate in the same manner as those of the driving side, so that one half of them will communicate with one port while the other half will communicate with the other port, it is apparent that the oil injected through one port will be received through the port channel into the piston chambers of the latter driven cylinder, and the pistons of the outer cylinder will thereby be forced outwardly, the thrust thereby imparted to the pitman connections being received by the socket ring 17 of that side and, if that ring is inclined, the tendency of such thrust will be to force it to revolve on its track in the direction of least resistance, which will be down the incline on the pressure side of the apparatus, as the same may be at the time. Therefore, if the tilting rings are set at similar inclinations with respect to the shafts, the two shafts will revolve in the same direction; but if they are oppositely inclined, the shafts will revolve in opposite directions. If the angle of inclination of the tilting ring of the driver is greater than that of the driven end of the device, the velocity of the driven shaft will relatively be greater than that of the driving shaft; and if the angle of inclination of the tilting ring of the driving shaft is less than that of the opposite end, then the velocity of the driven shaft will be less than that of the driving shaft. This is explainable on the ground that, for instance, if the stroke of the driving piston is twice that of the driven piston, then the angular velocity of the driven ring must be such that it will carry two of the receiving piston chambers across or over the port channel in order to take up and dispose of the oil delivered at one stroke of the driving piston. The element of leakage will of course, very slightly modify the ratio between the relative speeds of the two shafts of the apparatus, but not to a very appreciable extent. Thus every variation in the transmission of power and in the regulation of speed within the limits of the capacity of the apparatus by means of the tilting rings and inclined socket rings is attainable.

In order to maintain a constant velocity of the driven apparatus it is essential that the circulation of oil through the apparatus should be constant. As the pump cylinders revolve with the shafts, the velocity of the driving cylinder will be constant, and as the piston chambers and their outlets 70 are equally spaced around the cylinder, they will successively pass the admission and cut-off points of the ports of the valve plate in equal intervals of time, but on account of the peculiar relations of the socket ring to the Hooke's joint and its inclination to the driving shaft, its sockets will not successively pass the admission and cut-off points of the ports at equal time intervals, if their spacing is equal and conforms to the spacing of the chambers in the pump cylinders. The reason why this is so may be deduced from an inspection of Figs. 18 and 19. Suppose $x, x$, Fig. 19 to represent the axis of the driving shaft and the line $v' v'$ to represent the plane of the socket ring 17, which is perpendicular to the shaft. The line $t' t'$ shows the inclination of the socket ring with reference to the shaft when the machine is at work. The right hand part of the figure is a projection developed from the left hand part of the figure in which are shown the difference between the paths of movement of a point in the periphery of the socket ring when revolving in a plane perpendicular to the axis of the driving shaft as indicated by the line $v' v'$ and when it is inclined as indicated by the line $t' t'$. The former is shown by the circle F, which is concentric with the axis of the shaft C. The latter is elliptical as shown by the ellipse E. It is plain that when the ring is inclined as from the position of $v'$ to $t'$ the part most distant from its axis of inclination will lie closer to the shaft than before inclination, and a radius from the axis of the shaft extending perpendicularly to the most distantly inclined point of the socket ring, as shown at C $t'$, will be considerably shorter than a radius from the center to the periphery taken on its axis of inclination, which would be the axis of the tilting ring 3. When the trunnions 37 coincide with the axis of oscillation of the tilting ring, and the pivots 38 stand perpendicular thereto, or in the position indicated by the line $v v$, it follows that if the cylinder ports are equally spaced and the sockets of the ring correspondingly so, while a cylinder port is moving through the arc $w' w'$, its corresponding socket will only move through an arc which subtends the same angle as that subtended by the arc $w w'$, or from $n$ to $n'$, which is less than $w w'$. Under these conditions the result in operation would be as follows:—Suppose the cylinder ports to be divided into four quarter-section groups by longitudinal planes cutting the axes of the trunnions 37 and the pivots 38. Then as the cylinder revolves those ports which trail behind the plane of pivots 38 as they approach the channel of the valve plate, will not reach the admission point until after the completion of the piston stroke, and will reach the point of cut-off before the piston has completed its stroke. As it is important, for obvious reasons, that the times of admission and cut-off should coincide with the moment the piston passes dead center at the limit of its stroke, the driving sockets should be so spaced that when the socket ring is tilted to its proper angle of inclination, the length of the arc between any two driving sockets, measured on its elliptical or actual path of movement, shall agree with the length of the arc between the two corresponding cylinder ports. Hence, in order that the limits of the piston strokes shall agree in time with the moments of admission and cut-off of the ports, the sockets in the socket ring on either side of pivots 38 should be located a little nearer those pivots than equal spacing would place them. The whole scheme is shown in Fig. 18, where the axis of pivot 38 is represented by the dotted line 38$^a$, the location of the sockets in the socket ring by the circles in solid lines and the relative positions of the piston chambers in cylinders 6 by the dotted circles. By virtue of these provisions uniform pressure and an equable circulation can be maintained through the system when the socket rings are adjusted to the inclination which corresponds to the differential spacing of the sockets. In machines of this description in which this feature of differential spacing has been omitted the fact that the pistons have been compelled to make a part of their strokes while their respective chamber ports have been occluded by the valve plate, has seriously interfered with the smooth and successful operation of the machine.

*Operation of the machine.*—To put the machine in adjustment for operation the sink should be supplied with a sufficiency of oil to fully charge the system and leave a reserve to draw from to supply leakage. When the system is empty the cylinders are held in contact with the valve plate by the pressure of spring 43 alone, but this is sufficient for that purpose. The tilting ring on the driving end is brought to a position perpendicular to the driving shaft so that rotation will not affect the pistons, which should not be worked when the system is empty or when there is no pressure available to hold the pitmen 42 in working adjustment. The tilting ring of the driven end is set at a substantial angle of inclination. By means of the nuts 12 and 13 the tension of spring 32 is set or adjusted so as to cause a considerable degree of pressure to be developed in the exhaust port when the plunger is worked. As there is no pressure in that port when empty, no resistance to spring 32 is offered at the commencement of operation, and it will constantly force the plunger down as far as the shoulder on the rod 19 will permit. The driving shaft 15 is then started and the only resultant action is the rotation of the crank pin and the reciprocation of the piston rod 19. As the pin turns upwardly it engages shoulder 92 of the plunger gap and carries the plunger up with it followed by the oil through the suction plug 10 past valve 134 into passages 64. In making the down stroke the plunger will follow the pin under the pressure of the spring 32 and this will force the oil from passages 64 past valves 34, 34, into both ports, the air either escaping through the unlubricated joints of the machine or being compressed in the air chambers. The driving shaft is thus rotated until the plunger ceases to play, which indicates that the system is full. The controlling lever 5 of the driving end is thrown in one direction or the other according to whichever direction it is desired to rotate the driven shaft. If the tilting ring of the driven end is greatly inclined and that of the other end only slightly, the driving stroke of the pistons will be very short but the pressure upon the driven pistons correspondingly will be excessive, and the driven socket ring will start very slowly but very easily. As the inertia of the driven parts becomes absorbed the inclination of the driving ring may be increased to the desired point where the rate of driving speed becomes normal. If it is desired to maintain a constant velocity of the driver under a varying load or driven speed, it can be effected by the lever 5 of either end of the machine. If the load is increased the driving speed may be kept normal by increasing the inclination of the driven ring, or by decreasing that of the driving ring, and if the load is diminished the inclination may be diminished at the driven end or increased at the driving end. To reverse the motion of the driven shaft, tilt the driving ring to a perpendicular position when all motion ceases. Then reverse the inclination of one of the rings from its previous position, it matters not which, and start as before. The direction of the circulation can be reversed only by reversing the inclination of the driving socket ring, but a reversal of the circulation will reverse the motion of the driven ring for it transposes the relative direction of the inclines of the ball races of the two ends. If the circulation is not reversed a reversal of motion of the driven shaft can be effected only by reversing the inclination of the driven socket ring or ball race. Thus it may be seen that the driven motion may be reversed by either lever 5, and the speed of the driven shaft and its direction of motion within certain limits may be controlled by either lever 5, and within a still wider range, by the conjoint action of both levers.

In the application of my invention it is not material that the shafts be arranged co-axially, or that the valve faces be parallel or in any way connected other than by the transmission ports. The function of the tilting ring may be obtained by various modifications of the means for that end here shown. Absolute parallelism of the axes of the piston chambers with the axis of the cylinder in which they are carried is not essential although it has been preferred in this embodiment of the invention.

Other equivalent modifications of the provisions shown for replenishing the wasted circulation, for creating extra pressure in the exhaust port, for regulating the inclination of the socket rings, for neutralizing back pressure on the cylinders, for equalizing irregular pressure in the pressure port, and for any other of the subordinate details of the invention, could be substituted for the specific forms here shown without departing from the essential features and the spirit of my invention. Hence I do not limit myself in any way by the specific embodiment in its entirety or in its detail of the invention as herein specifically set forth.

I therefore claim and desire to secure by Letters Patent the following:—

1. In a fluid power transmission device, the combination with a valve plate and two rotatable barrels arranged on opposite sides of said valve plate and provided with cylinders arranged parallel to the axis of rotation, said cylinders being provided adjacent to the valve plate with ports of a smaller area than the main chambers of the cylinders, pistons movable in said cylinders, and rotatable adjustable tilting rings connected with said pistons.

2. In a fluid power transmitting device, the combination of a valve plate, rotatable barrels located on opposite sides of said valve plate and in engagement therewith, each of said barrels being provided with chambers or cylinders having ports at the said valve plate, the area of each cylinder port being smaller than the main area of the corresponding cylinder, and the adjacent surfaces of the valve plate and the barrels being spaced from each other at points to reduce the area of that portion on which the fluid forces itself under pressure between the barrels and the valve plate, tending to separate them, pistons movable within said cylinders, and rotary adjustable tilting rings connected with said pistons.

3. In a fluid power transmission device, the combination with a set of injecting pumps and a set of receiving pumps, each mounted on an independent revoluble carrier, the former set adapted to be connected with the power to act as drivers, and the latter set with the load or driven mechanism to act as motors, an interposed valve plate having transmission ports, revoluble rings with which the pistons of the pumps are operatively connected, trunnioned rings and means for inclining them with which said piston rings coöperate, and a resisting surface opposed to each piston within the pump barrel to neutralize back pressure and counteract the tendency of the pressure to open the running joints between the carriers and the valve-plate, substantially as specified.

4. In a fluid power transmission device, the combination with a set of injecting pumps and a set of receiving pumps, each mounted on an independent revoluble carrier, the former set adapted to be connected with the power to act as drivers, and the latter set with the load or driven mechanism to act as motors, an interposed valve plate having transmission ports, revoluble rings with which the pistons of the pumps are operatively connected, non-revoluble rings with which said piston rings coöperate, and a resisting surface opposed to each piston within the pump barrel to neutralize back pressure and counteract the tendency of the pressure to open the running joints between the carriers and the valve-plate, substantially as specified.

5. In a fluid power transmission device, the combination with a set of injecting pumps and a set of receiving pumps, each mounted on an independent revoluble carrier, the former set adapted to be connected with the power to act as drivers, and the latter set with the load or driven mechanism to act as motors, means for rotating the carriers and for reciprocating the pistons, a valve plate interposed between the carriers having transmission ports therebetween, and means, as a pump comprising a positively actuated piston rod which is secluded from the circulating medium and a yielding piston plunger interposed between said rod and medium in the circulatory channels for replenishing the waste of the circulating medium resulting from leakage or otherwise, substantially as specified.

6. In a fluid power transmission device, the combination with a set of injecting pumps and a set of receiving pumps, each mounted on an independent revoluble carrier, the former set adapted to be connected with the power to act as drivers, and the latter set with the load or driven mechanism to act as motors, means for rotating the carriers and for reciprocating the pistons, a valve plate interposed between the carriers having transmission ports therebetween, and means comprising a tubular plunger and a positively actuated piston rod working therein, a spring device between said rod and plunger, and means for relieving the vacuum between the rod and interior of the plunger when necessary, said plunger being connected with the circulatory channels adapted to produce in the exhaust an abnormal pressure, substantially as specified.

7. In a fluid power transmisson device, the combination with a set of injecting pumps and a set of receiving pumps, each mounted on an independent revoluble carrier, the former set adapted to be connected with the power to act as drivers, and the latter set with the load or driven mechanism to act as motors, means for rotating the carriers and for reciprocating the pistons, a valve interposed between the carriers having transmission ports therebetween, the pump pistons and their driver being coupled by an unconnected member, but with which they contact, and means, as a pump, connected with the circulatory channel for maintaining sufficient extra pressure in the exhaust port against the pistons to hold said coupling in working contact with the connecting members at its ends, substantially as specified.

8. In a fluid power transmission device, the combination with a set of injecting pumps and a set of receiving pumps, each mounted on an independent revoluble carrier, the former set adapted to be connected with the power to act as drivers, and the latter set with the load or driven mechanism to act as motors, means for rotating the carriers and for reciprocating the pistons, a valve plate interposed between the carriers having transmission ports therebetween, means comprising a positively actuated piston rod which is secluded from the circulating medium, a piston plunger in which said rod reciprocates, a plunger chamber which communicates with the circulatory channels and is exposed to fluctuations of pressure in the exhaust port, arranged to operate substantially in the manner described to replenish wasted circulation, substantially as specified.

9. In a fluid power transmission device, the combination with a set of injecting pumps and a set of receiving pumps, each mounted on an independent revoluble carrier, the former set adapted to be connected with the power to act as drivers, and the latter set with the load or driven mechanism to act as motors, means for rotating the carriers and reciprocating the pistons, a valve plate interposed between the carriers and having transmsision ports therebetween, and an injector for replenishing the circulation, consisting of an active member operatively connected with some operative part of the driving mechanism and secluded from the circulating medium, and a passive member intermediate the active member and the exhaust port, the passive member being adapted to be automatically controlled in its movement in one direction by falling pressure in the exhaust port resulting from the loss of circulating fluid, and in the opposite direction by a yielding connection with the active member of the combination, substantially as specified.

10. The combination with the valve plate pump cylinders pumps and means for actuating them, of a duct connected with a source of supply of the circulating medium and communicating with the exhaust side of the circulatory channel, fitted with valves to regulate the flow, and a pump connected with said duct consisting of a plunger fitted to slide in a chamber which opens into said duct, a rod fitted to reciprocate within said plunger positively and operatively connected with the driving member of the transmitter, an elastic device between said rod and plunger, and means connected with it for adjusting its tension with reference to the pressure in the exhaust port, the forward stroke of said plunger being effected by the elastic device and the return stroke by said driving member, the tension of the elastic device in practice being adjusted to exceed the normal working pressure in the exhaust port, substantially as specified.

11. In a machine of the character described, the combination of the rotatory driving ring and means for inclining the same with the rotatable carriers provided with piston chambers and pistons, means for connecting said pistons with the driving ring, the piston chambers being differentially spaced about their orbit of rotation with reference to the spacing of the points of driving connection with the driving ring, substantially as specified.

12. In a fluid power transmitting device, the combination of a valve plate, rotary barrels at each side thereof, each barrel being capable of sliding lengthwise of its axis of rotation and having cylinders contracted toward their outlets which are controlled by the valve plate, pistons movable within the cylinders and adaptel to force each barrel toward the valve plate on their inward stroke, springs for pressing the barrels toward the valve plate permanently, and rotatable inclined rings connected with the pistons.

13. In a fluid power transmission device, the combination with a valve plate, rotatable barrels located at each side of said valve plate and provided with cylinders having ports controlled by said plate, pistons movable in said cylinders, adjustable rotatable tilting members, each provided with a ring having as many sockets as the respective barrels have cylinders, said sockets being spaced differentially with reference to the spacing of the pistons, and connecting rods extending from said sockets to the pistons.

14. In a fluid power transmission device, the combination of a valve plate, rotary barrels engaging said plate on opposite sides and provided with cylinders having ports controlled by said valve plate, said cylinders being evenly spaced, pistons within said cylinders, a rotatable adjustable tilting member having a socket ring, the sockets of which are unevenly spaced, and connecting rods extending from said sockets to the pistons.

15. In a fluid power transmission device, the combination of a valve plate, rotary barrels engaging the same on opposite sides and provided with cylinders having ports controlled by said valve plate, pistons within said cylinders, a rotary adjustable tilting member having a ring with unevenly-spaced sockets, and connecting rods extending from said sockets to the respective pistons.

16. The combination of a rotatable barrel provided with cylinders arranged lengthwise of its axis of rotation, each cylinder being provided at one end with a port of a smaller area than the main chamber of the cylinder, a stationary member having channels the ends of which are adapted to register with said cylinder ports, pistons movable in said cylinders, and a rotary inclined member connected with the said pistons.

17. The combination of a rotatable barrel provided with cylinders arranged lengthwise of its axis of rotation, each cylinder being provided at one end with a port of a smaller area than the main chamber of the cylinder, a stationary member having channels the ends of which are adapted to register with said cylinder ports, pistons movable in said cylinders, a rotary adjustable tilting member connected with said pistons, and means for varying the inclination of said tilting member.

18. The combination of a rotatable barrel provided with cylinders arranged lengthwise of its axis of rotation, each cylinder being provided at one end with a port of a smaller area than the main chamber of the cylinder, a stationary member having channels the ends of which are adapted to register with said cylinder ports, the adjacent surfaces of the stationary member and of the barrel being spaced from each other at a portion of their area so as to reduce the area of that portion on which the fluid, forcing itself under pressure between the barrel and the stationary member, tends to separate them, pistons movable in said cylinders, and a rotary inclined member connected with said pistons.

19. The combination of a stationary member having channels, a rotary barrel located adjacent to said member and capable of sliding lengthwise of its axis of rotation, a spring for pressing the barrel toward the stationary member, said barrel being provided with cylinders contracted toward the stationary member and having ports adapted to register with said channels, pistons within the cylinders, and a rotatable inclined ring connected with the pistons.

20. In a fluid power-transmitting device, the combination with two rotatable barrels, each provided with cylinders arranged lengthwise of its axis of rotation, and each cylinder being provided at one end with a port of a smaller area than the main chamber of such cylinder, of a stationary member having channels, the ends of which are adapted to register with the said cylinder ports, pistons movable in said cylinders, a rotary adjustable tilting ring connected with the pistons of one barrel, and a rotatable inclined ring connected with the pistons of the other barrel.

21. In a fluid power-transmitting device, the combination with a stationary member having channels for the circulation of a fluid, of rotatable barrels arranged in engagement with said stationary member at the ends of said channels, each of said barrels being provided with chambers or cylinders having ports adjacent to the said stationary member, the area of each cylinder port being smaller than the main area of the corresponding cylinder, and the adjacent surfaces of the stationary member and the barrels being spaced from each other at a portion of their area so as to reduce the area of that portion on which the fluid, forcing itself under pressure between the barrels and the stationary member, tends to separate them, pistons movable within said cylinders, a rotary adjustable tilting ring connected with the pistons of one barrel, and a rotatable inclined ring connected with the pistons of the other barrel.

22. In a fluid power-transmitting device, the combination with a stationary member having channels for the circulation of fluid, with ports at each end of such channels, of rotary cylinder barrels adjacent to the port surfaces of said stationary member, each barrel being capable of sliding lengthwise of its axis of rotation, springs for pressing the barrels toward said port surfaces, the cylinders being contracted toward the stationary member, pistons within the cylinders, a rotary adjustable tilting ring connected with the pistons of one barrel, and a rotatable inclined ring connected with the pistons of the other barrel.

23. In a fluid power-transmitting device, the combination of a stationary member provided with channels for the circulation of fluid, with ports at each end of said channels, of rotary barrels located in engagement with the port surfaces of said stationary member and provided with cylinders having ports controlled by said stationary member, pistons movable in said cylinders, rotary inclined members, each provided with as many sockets as the respective barrels have cylinders, said sockets being spaced differentially with reference to the spacing of the pistons, connecting rods extending from said sockets to the pistons, and adjusting means for one of said inclined members.

24. The combination of a stationary member having channels for the passage of fluid, with ports at each end of such channels, a rotary barrel engaging a port surface of said stationary member, and provided with cylinders having ports controlled by said member, said cylinders being evenly spaced, pistons within said cylinders, a rotary adjustable tilting member having a socket ring, the sockets of which are unevenly spaced, and connecting rods extending from said sockets to the pistons.

25. The combination of a stationary member having channels for the passage of fluid, with ports at each end of said channels, a rotary barrel engaging a port surface of said stationary member and provided with cylinders having ports controlled by said member, pistons within said cylinders, a rotary adjustable tilting member having a ring with unevenly spaced sockets, and connecting rods extending from said sockets to the respective pistons.

26. The combination of a rotatable member provided with cylinders, each cylinder being provided at one end with a port of smaller area than the main chamber of the cylinder, a stationary member having channels which are adapted to register with said cylinder ports, pistons movable in said cylinders, and a connection between said pistons.

27. The combination of a stationary member having channels, the rotatable member provided with cylinders having ports adapted to register with said channels, pistons in said cylinders, a connection between said pistons, and means for causing the fluid in the cylinders, when under pressure, to force the rotary member toward the stationary member and thus to counteract the tendency of the fluid to separate the two members.

28. In a variable speed gear, the combination with a pump and motor having a fluid connection between them of a basin located below the said named parts and adapted to catch and contain fluid for the fluid connection, and an auxiliary pump adapted to draw fluid from said basin to replenish waste in said fluid connection.

29. In a variable speed gear, the combination of a pump and motor having a fluid connection between them, a protective frame for said named parts adapted to catch and carry fluid for said connection, the lower part of said frame being adapted to act as a basin for such fluid, and an auxiliary pump adapted to draw fluid from said basin to replenish waste in said fluid connection.

30. In a variable speed gear the combination with a pump and motor having a fluid connection between them, a protective frame adapted to catch and carry fluid for said connection, means for collecting such fluid as is thus caught by said frame and a return connection from the said collecting means to the fluid connection between the pump and motor, said return connection comprising an auxiliary pump adapted to replenish waste in said fluid connection from the fluid caught and collected in said collecting means.

31. In a variable speed gear the combination with a pump and motor having a fluid connection between them, a protective frame having a tight bottom adapted to catch and carry fluid for said connection, means for collecting such fluid as is caught by said frame and a return connection from the said collecting means to the fluid connection between the pump and motor, said return connection comprising an auxiliary pump adapted to replenish waste in said fluid connection from the fluid caught and collected in said collecting means.

32. In a variable speed gear the combination with a pump and motor having a fluid connection between them, a protective frame adapted to catch and carry fluid for such connection, means for collecting such fluid as is thus caught by said frame and a return connection comprising a pump automatically operated to replenish from said collecting means any waste in said fluid connection.

33. In a variable speed gear the combination with a pump and motor having fluid connections between them, of a protective frame adapted to catch and carry fluid for said connection, the lower part of said frame being arranged to act as a collecting basin for such leakage from said fluid connection as may be caught by said frame, and an auxiliary pump adapted to draw fluid from said basin to replenish waste in said fluid connection.

34. In a variable speed gear, the combination with a pump and motor having fluid connections between them, a protective frame adapted to catch and carry fluid for such connection, means acting as a fluid storage chamber communicating with and adapted to replenish waste in said fluid connection as soon as it occurs, means adapted to collect such leakage from the fluid connection as may be caught by the said frame, a channel adapted to conduct fluid from such last named means into said storage chamber and means for transferring fluid from said collecting means to said storage chamber and from said storage chamber into said connections as required to replenish waste.

35. In a variable speed gear, the combination with a pump and motor having fluid connections between them, of a fluid storage chamber located intermediate of the pump and motor and communicating with and adapted to replenish waste in said fluid connections as soon as it occurs, a protective casing adapted to catch and carry fluid for said connection, a basin adapted to receive any fluid caught by said casing, a channel adapted to conduct fluid from said basin into said storage chamber, valved means connecting said channel and said storage chamber and means for transferring fluid from said basin to said storage chamber and from said storage chamber into said connections as required to replenish waste.

In testimony whereof, I have hereto subscribed my name at the city of Washington, D. C., this 14 day of August, A. D., 1901, in the presence of two witnesses.

HARVEY D. WILLIAMS.

Witnesses:
FRANCIS S. MACHEN,
JOSEPH REGLI.